(12) United States Patent
MacTiernan et al.

(10) Patent No.: US 11,816,705 B2
(45) Date of Patent: Nov. 14, 2023

(54) AUTOMATED GENERATION OF CREATIVE PARAMETERS BASED ON APPROVAL FEEDBACK

(71) Applicant: iHeartMedia Management Services, Inc., San Antonio, TX (US)

(72) Inventors: Daniel N. MacTiernan, Ocean City, NJ (US); Tamala Edmonds, Atlanta, GA (US); Brian Kaminsky, Hewlett, NY (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 20 days.

(21) Appl. No.: 17/012,422

(22) Filed: Sep. 4, 2020

(65) Prior Publication Data
US 2022/0076206 A1    Mar. 10, 2022

(51) Int. Cl.
*G06Q 30/0241*  (2023.01)
*G06Q 30/0251*  (2023.01)

(52) U.S. Cl.
CPC ..... *G06Q 30/0277* (2013.01); *G06Q 30/0271* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 2008/0040318 A1* | 2/2008 | Stanis | G06T 11/60 |
| 2013/0246194 A1* | 9/2013 | Brown | G06Q 30/0241 |
| | | | 705/14.72 |
| 2016/0098701 A1* | 4/2016 | Harris | G06Q 30/0267 |
| | | | 705/14.64 |
| 2018/0075474 A1* | 3/2018 | Tveit | G06Q 30/0242 |
| 2019/0349251 A1* | 11/2019 | Weldemariam | H04L 41/0895 |
| 2019/0355024 A1* | 11/2019 | Han | G10L 21/013 |

OTHER PUBLICATIONS

F. Murf.AI, "Create Spotify Ads. Not in 48 hours. In Minutes.", retrieved from the Internet: <URL: https://murf.ai/voiceover/spotify-ads>, available on Jun. 15, 2020 (Year: 2020).*

* cited by examiner

*Primary Examiner* — Sam Refai
(74) *Attorney, Agent, or Firm* — Harness, Dickey & Pierce, P.L.C.

(57) ABSTRACT

A script creation system obtains both current user-specified attributes to be used in generating a new media creative, and historical data including historical user-specified attributes associated with previously generated media creatives. The script creation system generates a set of creative parameters specifying content characteristics of the new media creative based on the user-specified attributes and the historical data. The set of creative parameters are transmitted from the script creation system to a media creative generation system. The script creation system receives the new media creative generated by the media creative generation system, and provides the new media creative to an end user system associated with an end user. The script creation system receives feedback associated with the new media creative, and stores the feedback, the set of creative parameters, and the current user-specified attributes as historical data.

20 Claims, 11 Drawing Sheets

FIG. 9

AUTOMATED GENERATION OF CREATIVE PARAMETERS BASED ON APPROVAL FEEDBACK

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to producing creatives, and mores specifically to automated generation of creative parameters based on approval feedback.

2. Description of Related Art

Currently, almost the entire process of producing creatives, such as those used in radio advertising, is performed manually. Typically, a business will engage an agency or other entity to produce a creative on their behalf. The business typically provides specific information about nearly every aspect of the creative's content. In the case of an audio advertisement, for example, the business usually must decide which music to use in the background of the advertisement, the type of voice to be used, specific keywords, and the like. Even though parts of the manual creative-generation process have been automated, for example by gathering human input using a web page, the same human inputs are required each time a new creative is generated, regardless of whether the creative generation process uses a manual, automated, or hybrid manual/automated technique. Requiring a human to provide detailed creative input regarding each specific aspect of a new creative can be inefficient, costly, and may result in generation of less-than optimal creatives. Thus, currently available systems and techniques for generating creatives are less than perfect.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE DRAWINGS

FIGS. 5-9 are diagrams illustrating graphical user interfaces used to obtain information about a requested creative, in accordance with various embodiments of the present disclosure;

DETAILED DESCRIPTION OF THE INVENTION

Figure 1:
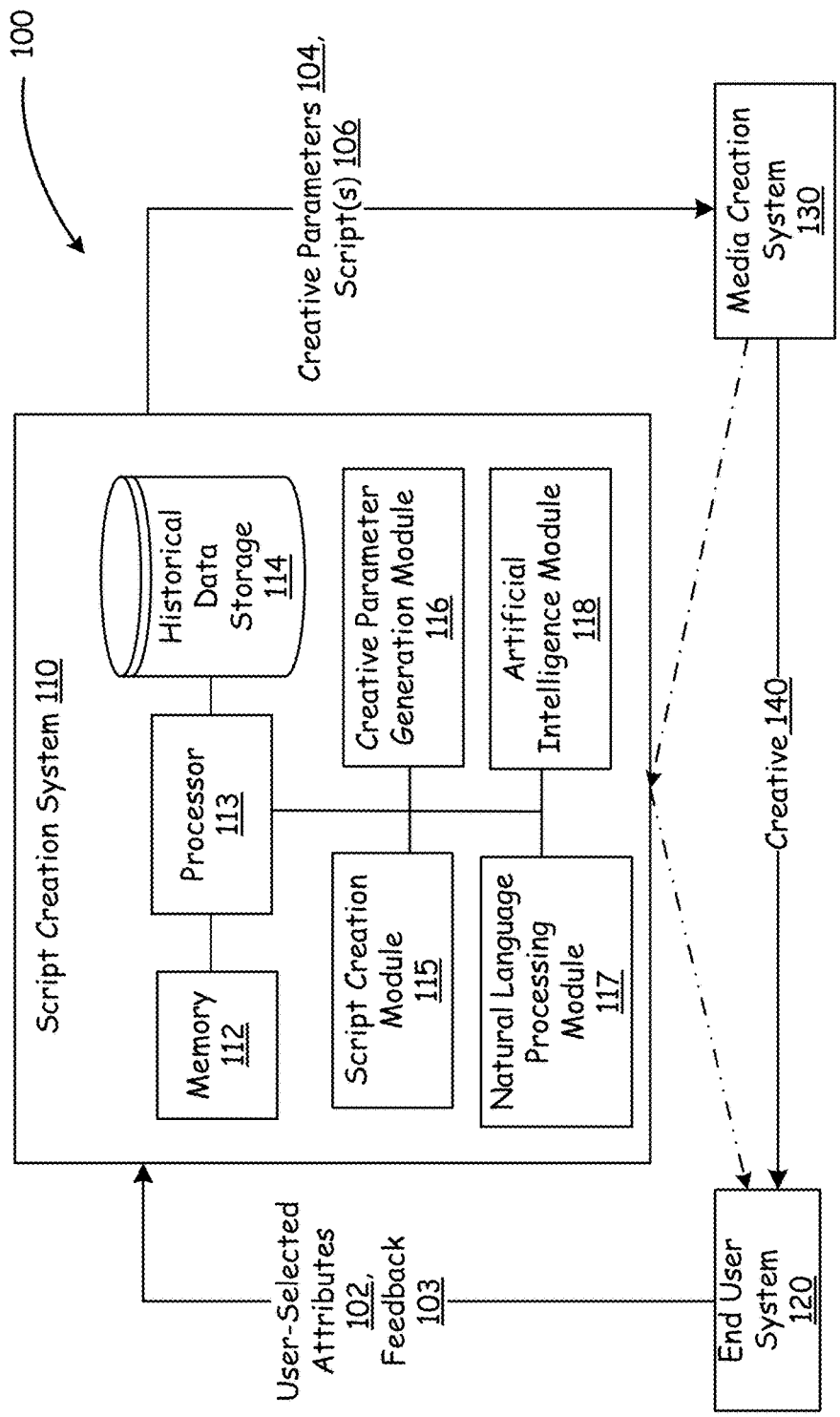
FIG. 1 is a schematic block diagram illustrating a media creative generation system, in accordance with various embodiments of the present disclosure.

Improved systems, devices, and techniques for automating various aspects of the creative generation process are disclosed herein. As used herein, the term "creative" is used as a noun, and generally refers to an object created for use as an advertisement, or for use in creating an advertisement. For example, a 30 second audio recording used to advertise a store's grand opening is a creative. In some instances, a script that includes content to be read by a performer to generate an audio file can be considered a creative, because creating the text of the script involves creativity. However, in a majority of cases, the term "creative" is used herein to refer to the resulting audio file. Although the present disclosure focuses primarily on audio files, the teachings set forth herein can also be applied to other types of creatives, including but not limited to video recordings, audio-visual recordings, print creatives, and live performances produced using a print creative, whether those live performances are recorded or not.

In general, the following discussion describes systems, devices, and methods used to generate a media creative that can be inserted into a log, or schedule, used to control playout of media items via an over-the-air radio broadcast, via an Internet radio station, via an audio podcast, or the like. But the techniques and devices discussed herein can also be used to produce a creative for distribution via any known medium, including print, television, or satellite.

The process of generating a creative can begin with a user providing user-selected attributes of the creative via an online interface. The user-selected attributes need not define detailed creative aspects of the creative being generated. Instead, users provide only general information, such as industry, location, which are used to generate the specific creative parameters used to generate the creative itself. Thus, it is unnecessary for users to have detailed knowledge of the underlying creative-generation process.

In various embodiments, creative parameters used to generate new creatives can be automatically selected or adjusted based primarily on accept/reject decisions associated with other, previously generated creatives. Basing selection of creative parameters on accept/reject decisions can avoid the necessity of requiring users to complete in depth "surveys," which few people actually respond to.

In some implementations, machine learning techniques, commonly referred to as artificial intelligence ("AI"), can be employed to determine optimal creative parameters for use in generating new creatives. Optimal creative parameters can be determined by evaluating historical data associated with previously generated creatives to identify previous creatives having attributes most closely matching currently submitted user-selected attributes. Historical data can include user/client identifiers, creative identifiers, current creative parameters, actual creative parameters, user-selected attributes, and feedback results. Historical creative parameters associated with the identified creatives can be used to select current creative parameters for use in generating a new creative. Factors in addition to user acceptance or rejection of a creative can also be taken into account. For example, an impression rate associated with an accepted creative can be used to further refine the selection of creative parameters. In some embodiments, a creative that is more likely to be accepted by a user is considered more optimal than a creative that is less likely to be accepted by a user. Likelihood of acceptance of a creative can be determined based on historical acceptance rates associated with particular creative parameters.

Referring now to FIG. 1, a media creative generation system 100 will be discussed in accordance with various embodiments of the present disclosure. In at least one embodiment, media creative generation system 100 is an audio creative generation system. Media creative generation system 100 includes script creation system 110, end user system 120, and media creation system 130. Script creation system 110 includes memory 112, processor 113, historical data storage 114, script creation module 115, creative parameter generation module 116, natural language processing module 117, and artificial intelligence ("AI") module 118.

The natural language processing module 117 and artificial intelligence module 118 can be used to analyze text and media creatives to identify actual characteristics (e.g. actual creative parameters) of the creatives, patterns of those characteristics, and how those characteristics and patterns relate or influence downstream results, e.g. the media creative produced, the user's satisfaction with the creative, and the like. For example, a media creative asset could be the result of a myriad of creative decisions including the voice actor gender, age, and ethnicity, background music bed, sound effects, and the like.

In general, end user system 120 can initially provide user-selected attributes 102 to script creation system 110 in conjunction with a request for a creative to be generated, either individually or as part of an advertising campaign. Script creation system 110 can use user-selected attributes 102 to generate creative parameters 104, and can transmit creative parameters 104 to media creation system 130, which can generate creative 140 based on the creative parameters 104. In at least one embodiment, media creation system 130 is an audio creation system. In some embodiments, script creation system 110 can also generate scripts 106, and can transmit the scripts to media creation system 130, which can use the scripts to generate creative 140.

Media creation system 130 can transmit creative 140 to end user system 120 for acceptance directly, as illustrated by the solid line, or via script creation system, as illustrated by the broken line. End user system 120 can provide feedback 103 to script creation system 110, which can use the feedback as a basis for generating creative parameters 104 for future creatives.

Figure 11:
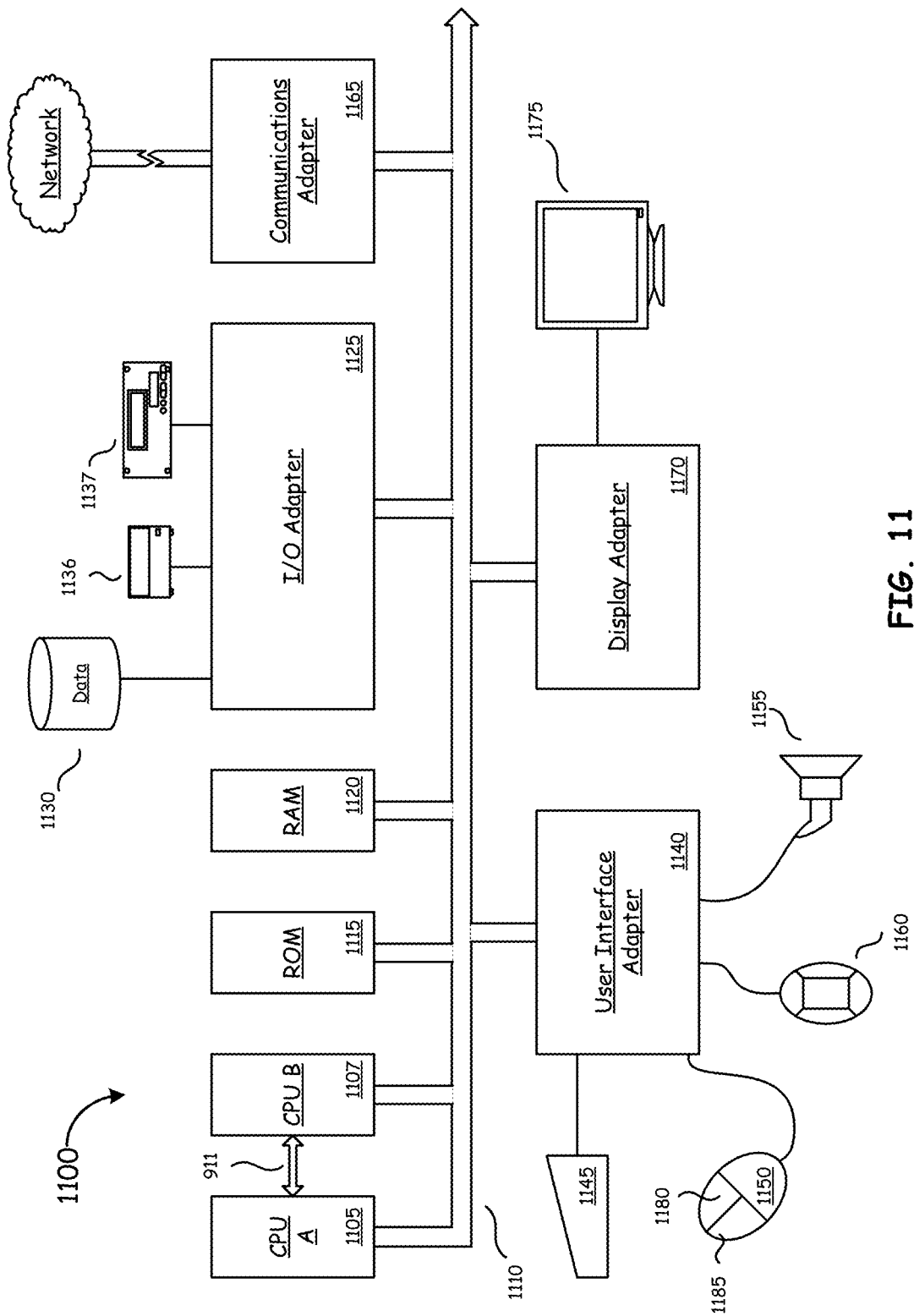
FIG. 11 is a high-level block diagram of a processing system, part or all of which can be used to implement various modules, servers, machines, systems, and devices, in accordance with various embodiments of the present disclosure.

End user system 120 can be any suitable processing system, an example of which is illustrated in FIG. 11. In various embodiments, a user of end user system 120 can access a webpage associated with script creation system 110 to request generation of a creative. In response to the request, media creative generation system 100 can transmit to end user system 120 a series of one or more webpages, one or more links to the one or more webpages, or other information allowing end user system 120 to access the one or more webpages. Those webpages can be configured to generate graphical user interfaces (GUIs) that allow the user to enter or select user-selected attributes of the requested creative, and transmit those user-selected attributes. More details regarding the GUIs used to obtain user-selected attributes are provided subsequently with reference to FIGS. 5-8. In some embodiments, the webpages can include logon pages into which a user can enter preestablished credentials that allow the user to use media creative generation system 100.

In some embodiments, script creation system 110 generates and transmits the one or more webpages to end user system 120, while in other embodiments script creation system 110 delegates communication of the one or more webpages to a secure webserver (not illustrated), and receives input from end user system via the secure webserver. In other embodiments, a specialized server, virtual private network, or other communications module can be used to allow users direct access to script creation system 110.

Script creation system 110 can receive user-selected attributes 102, and create a record associating the request, with the user-selected attributes, a user/client identifier, and a creative identifier. The record can be stored in historical data storage 114, memory 112, or in another suitable location accessible to script creation system 110. In various embodiments, historical data storage 114 can be implemented using multiple devices or databases, each storing one or more portions of a historical record, or one or more different types of historical data. Where different types of historical data are stored in different databases, records or devices, each record can include links associating the different types of historical data. For example, media creatives may be stored in one storage device, while user selected attributes and other data associated with the media creatives are stored in a different storage device. In those cases, the media creatives can be linked to its associated metadata using a relational database, or by using other suitable techniques.

Creative parameter generation module 116 can generate creative parameters 104 based on the user-selected attributes 102. Script creation module 115 can use some or all of the creative parameters 104 to generate script 106. Natural language processing module 117 can convert audio and text content of previously generated creatives stored in historical data storage 114 into data for analysis by artificial intelligence module 118, which identifies patterns and linkages between user-selected attributes, creative parameters, and feedback results. The output of artificial intelligence module 118 can be provided to creative parameter generation module 116, which can use that information to optimize creative parameters 104.

In some embodiments, creative assets, e.g. audio files including a creative, can be stored in historical data storage 114 in digital form, so natural language processing module 117 does not need to perform analog to digital conversion of creative assets on creatives obtained from historical data storage 114. In some embodiments, however, natural language processing module 117 includes an analog-to-digital module (not illustrated), and is capable of sampling and digitizing analog creatives to convert them to digital files in preparation for further evaluation or storage.

Natural language processing module 117 can operate on digital creatives by identifying phonemes, syllables, letters, words, or base pairs, and examines these parameters in the context of surrounding phonemes or parameters, and uses statistical analysis and modeling to identify words and sentences. Examples of the types of analysis performed by natural language processing module 117 include n-gram analysis, maximum entropy models, statistical methods and neural networks, and can employ speech recognition models such as Gaussian mixture model/Hidden Markov model (GMM-HMM) or Long short-term memory (LSTM). Natural language processing module 117 can also be used to identify speech characteristics, such as tone, pace, pitch, and volume by evaluating the primary and harmonic frequencies, amplitudes, and patterns of digitized media creatives. For example, the language processing module 117 can use morphological analysis, syntactic analysis, and lexical and rational semantics to identify speech characteristics.

Some or all of the processing performed by natural language processing module 117 can be performed prior to storing the creative and its associated data in historical data storage 114. For example, natural language processing module 117 can evaluate a creative asset after generation and before storage to determine the actual creative parameters of the creative, and whether the actual creative parameters match the intended creative parameter, i.e. creative parameters 104, provided to media creation system 130. For example, creative parameters 104 may include a "pace" creative parameter indicating that the creative is intended to have a "slow" pace. Evaluation of the creative generated by media creation system 130 may indicate that the actual pace of the creative is "moderate," rather than "slow." In that case, natural language processing module 117 can associate the "actual" creative parameter with the creative asset, and store the "actual" creative parameter in historical data storage 114. In some embodiments, the actual creative parameter is stored in place of the intended creative parameter, but other implementations store both the intended creative parameter and the actual creative parameter.

Although illustrated separately from artificial intelligence module 118, natural language processing module 117 can be implemented using artificial intelligence techniques, devices, and modules, some or all of which can be included in artificial intelligence module 118.

Artificial intelligence module 118 can include multiple sub-modules, each of which performs dedicated tasks. For example, artificial intelligence module 118 can include a sub-module programmed to identify links between industries, tones, and acceptance statuses of multiple different creative assets, i.e. historical creatives, stored in historical data storage 114. This information can be used to identify an optimal tone of a new creative associated with a particular industry. Another sub-module can be programmed to identify links between locations, voice types, and acceptance statuses of historical creatives. This information can be used to determine an optimal voice type for a new creative associated with a particular location. When a new creative is requested by a user associated with a particular industry in a particular location, artificial intelligence module 118 can determine the optimal combination of tone and voice type for the indicated combination of industry and location.

In at least some embodiments, the evaluations made by artificial intelligence module 118 can include using go/no-go decisions, pattern rules, and the like. For example, if there is no historical creative having a particular combination of a first tone and a first location that has been accepted, the first tone may not be used for new creatives associated with the first location. In other embodiments, however, a percentage likelihood can be constructed based on the evaluation by artificial intelligence module 118 of historical creatives. For example, assume that creatives employing a first tone associated with a particular location have been accepted 10% of the time, while creatives for that same location, but having a second tone, are accepted 90% of the time. In that case, the second tone would be considered more optimal for use in conjunction with that location than the first tone. Of course, the situation may be reversed at a second location, so that the first tone is more optimal than the second tone at the second location. In yet other embodiments, other statistical and heuristic techniques can be used to rate and evaluate various actual and user-selected attributes, various actual and intended creative parameters, and the like. These techniques can include best-fit curve analysis, the evaluation of a local or global maxima or minima, averages, medians, pattern matching, and the like. At least some embodiments employ multi-agent planning, which relies on the cooperation and competition between individual sub-modules of artificial intelligence module 118 to make decisions.

Script creation module 115, like natural language processing module 117, can be implemented using one or more sub-modules of artificial intelligence module 118. In general, script creation module 115 can use creative parameters 104, which are generated by creative parameter generation module 116, to automatically generate a script 106, which can be provided to media creation system 130. Script 106 can be generated by modifying a default script, obtained from historical data storage 114, based on creative parameters 104 to generate a text creative asset used as a basis for generating a new creative by media creation system 130.

A default script can be selected from among scripts associated with previously generated creatives having similarly user-selected attributes. For example, artificial intelligence module 118 can provide script creation module 115 with an identifier of a historical creative deemed to be optimal for a given set of user-selected attributes that most closely matches current user-selected attributes associated with a request for a new creative. Script creation module 115 can use the identifier to retrieve a default, script to be used as the basis for generating script 106. The user-selected attributes of the default script can be compared to the current user-selected attributes, and provided to natural language processing module 117 as a basis for selecting particular word or phrase modifications to optimize the default script, e.g. to make the default script more likely to be effective or more likely to be accepted by the user requesting the new creative. Script creation module 115 can make the modifications to the default script, thereby generating a current script, such as script 106, which is provided to media creation system 130, and stored in historical data storage 114.

Creative parameter module 116 can be implemented using one or more sub-modules of artificial intelligence module 118. In some embodiments, creative parameter module 116 operates in cooperation with natural language processing module 117 and artificial intelligence module 118 to identify and select optimal creative parameters to use for generating a new creative. Creative parameters establish attributes, ranges, thresholds, and the like that are to be used by script creation module 115 and media creation system 130 to generate an optimum creative.

Creative parameter module 116 may obtain as input current user-selected attributes, a current user/client identifier, and a current creative identifier, each of which is associated with a request to generate a new creative. In some embodiments, creative parameter module 116 obtains one or more of the inputs by originally generating them, or by using default inputs. However, in other embodiments processor 113 executes a program of instructions stored in memory 112 to generate a record of these inputs, and stores that record in historical data storage 114, or in another memory accessible to script creation system 110. Creative parameter module 116 uses the input to obtain, either directly or through another module, additional information that allows creative parameter module 116 to determine optimal creative parameters for the new creative to be generated. More details regarding the selection, or generation, of creative parameters by creative module 116 is discussed subsequently with reference to FIG. 4.

Media creation system 130 is, in various embodiments, a third-party service that receives either or both creative parameters 104 and script(s) 106 from script creation system 110, and provides creative 140 as an output. In some embodiments, media creation system 130 includes the use of human agents to act out, read, compose, or otherwise create a media creative based on creative parameters 104 and script(s) 106. Media creation system 130 can receive multiple creative parameters, including 104 and script(s) 106, as part of an automated process that uses queries by media creation system 130, requests for new creatives by script creation system 110, scheduled data transfers, or the like. The creatives can be delivered either to script creation system 110, or to end user system 120 at the direction of script creation system 110. When media creation system 130 sends the creative 140 to end user system 120, a copy of the creative 140 is sent to script creations system 110 for storage and potential pre-processing.

End user system 120 can receive creative 140 in conjunction with a request for feedback. The request for feedback will specify, in at least one embodiment, end user system 120 to transmit the feedback 103 to script creation system, which will link the feedback 103 to the appropriate creative, and store the feedback 103 in historical data storage 114. If the feedback indicates acceptance of creative 140, the creative can be delivered to a broadcast system (not illustrated) for broadcast over the air, via a streaming media channel, or otherwise.

Figure 2:
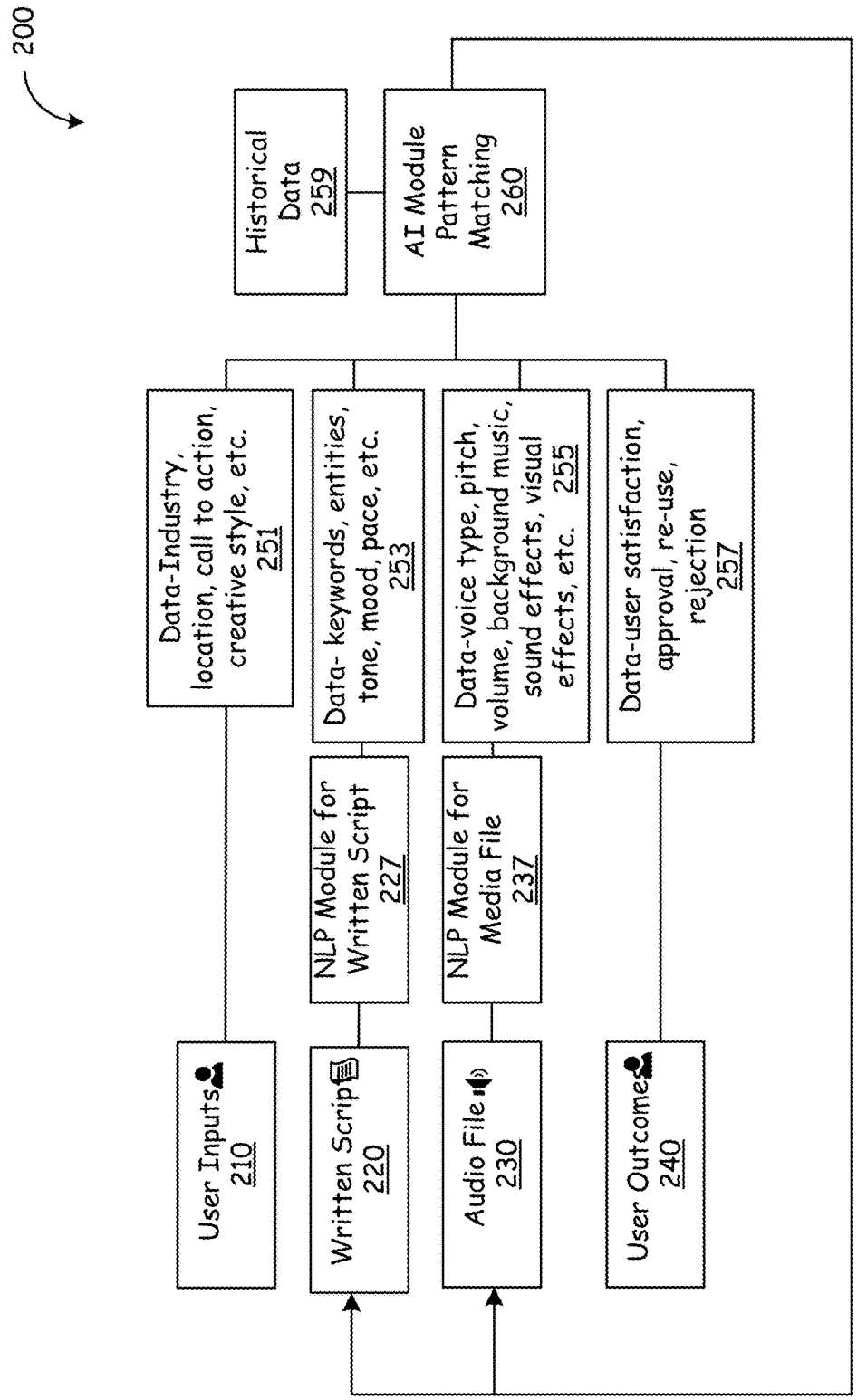
FIG. 2 is an information flow diagram illustrating a script creation system that employs a feedback loop, in accordance with various embodiments of the present disclosure.

Referring next to FIG. 2 an information flow diagram 200 of a script creation system employing a feedback loop, such as script creation system 110 (FIG. 1), will be discussed in accordance with various embodiments of the present disclosure. A shown by information flow diagram 200, user inputs 210 can include first data 251, such as an industry associated with the user, a location of the user's business and or a location where the creative is to be broadcast, a call to action, a style of the creative, and the like.

A written script 220, which can be obtained from script creation module 115 (FIG. 1), from media creation system 130 (FIG. 1), or from historical data storage 114 (FIG. 1), can be delivered to a natural language protocol module for scripts 227. Written script 220 can include a full text document to be performed by a human, an "outline" type document with particular bullet points and keywords to be read aloud by a human, or the like. The outputs of natural language protocol module for scripts 227 can include second data 253, such as keywords, entities mentioned in the script, tone, mood, pace, and the like.

Audio file 230, which can be obtained from media creation system 130 (FIG. 1), or from historical data storage 114 (FIG. 1), can be delivered to a natural language protocol module for audio file 237. The outputs of natural language protocol module for audio file 237 can include third data 255, such as voice type, pitch, volume, background music, sound effects, and the like.

User outcomes 240 includes fourth data 257 such as results of user satisfaction questionnaires, re-use status, rejection or acceptance status, or the like.

First data 251, second data 253, third data 255, and fourth data 257 can all be provided as input to artificial intelligence pattern matching module 260. Note that historical data 259, which can include historical versions of first data 251, second data 253, third data 255, and fourth data 257 can also be obtained by artificial intelligence pattern matching module 260.

Figure 3:
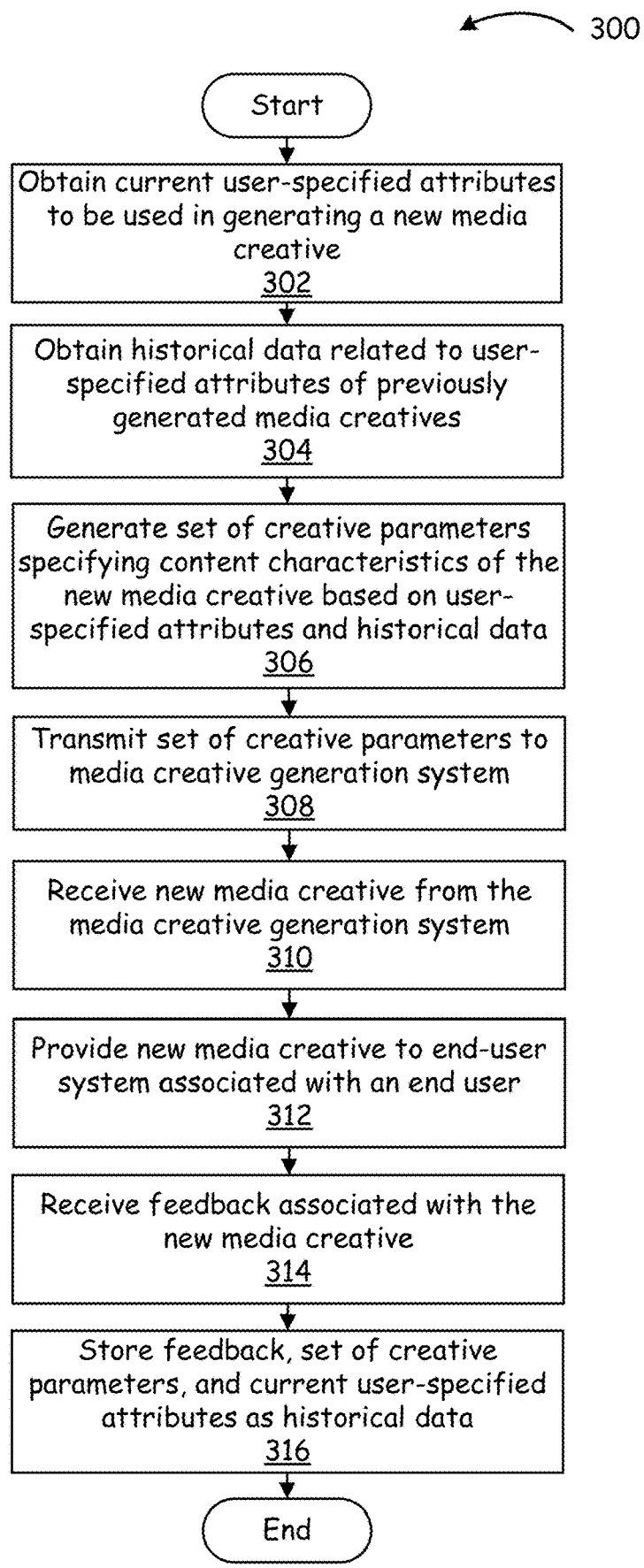
FIG. 3 is a flowchart illustrating a method illustrating operation of a script creation system, in accordance with various embodiments of the present disclosure.

Referring to FIG. 3 a method 300 of operating a script creation system will be discussed in accordance with various embodiments of the present disclosure. As illustrated by block 302 a script creation system, such as script creation system 110 of FIG. 1, may obtain current user-specified attributes to be used in generating a new media creative. The current user-specified attributes can be obtained from user input entered into one or more graphical user interfaces (GUIs) presented on an end user system, such as end user system 120 (FIG. 1). Examples of these GUIs are discussed subsequently with respect to FIGS. 5-9. In some embodiments, current user-specified attributes can be obtained via a batch file download from one or more user systems. In some embodiments, script creation system 110 can be implemented as a service available to third parties providing audio creation services. In some such embodiments, the current user-specified attributes can be received, from the third-party system.

As illustrated by block 304, the script creation system obtains historical data related to user-specified attributes of previously generated media creatives. The historical data can be obtained from an internal storage device implementing a historical database, such as historical data storage 114, from another storage device included in the script creation system, or from an external storage device accessible to the script creation system. In various embodiments, historical data related to user-specific attributes includes, but is not limited to, user identifiers, creative identifiers, intended creative parameters generated to be used by a media creation system, actual creative parameters reflecting the attributes of the previously generated media creative (whether or not they match the intended creative attributes), user-selected attributes, feedback results, and the like.

As illustrated by block 306, the script creation system may generate a set of creative parameters specifying content characteristics of the new media creative. The set of creative parameters is generated may be based on the user-specified attributes and the historical data. Generating the set of creative parameters can include, but is not limited to, generating a completely new set of creative parameters, selecting a set of previously approved creative parameters and using them without change, selecting a set of previously approved set of creative parameters and removing or adding creative parameters from the set, altering a value of one or more creative parameters, combining selected creative parameters from multiple different sets of historical parameters to generate a combined set of historical parameters, or the like.

Generating the set of creative parameters can also include requesting one or both of a natural language processing module or an artificial intelligence module to provide input regarding optimal creative parameters. Various embodiments of methods that can be used to generate creative parameters are discussed in greater detail with respect to FIG. 4.

As illustrated by block 308, the script creation system can transmit the set of creative parameters to a media creative generation system 130, which produces the new creative in accordance with the creative parameters. As illustrated by block 310, the script creation system can receive the new creative generated by the media creative generation system.

As illustrated by block 312, script creation system 110 can provide the new media creative to the end user system, usually in conjunction with one or more requests for feedback regarding the new media creative. The request(s) for feedback can include a request at any level of detail deemed necessary, but in at least one embodiment an initial request for feedback is specifically limited to an accept/reject/conditionally accept decision. Limiting the level of detail included in the feedback can preserve potentially limited computing resources by decreasing the number of factors to be considered when determining whether creative parameters are optimal. As illustrated by block 314, in response to the request for feedback, script creation system 110 receives feedback associated with the new media creative.

As illustrated by block 316 the script creation system can store the feedback, the set of creative parameters, and the current user-specified attributes as historical data. In some embodiments, some or all of the data associated with the new creative can be stored as historical data in advance of receiving the feedback. In some such embodiments, the feedback can be stored and linked to the previously stored information.

Figure 4:
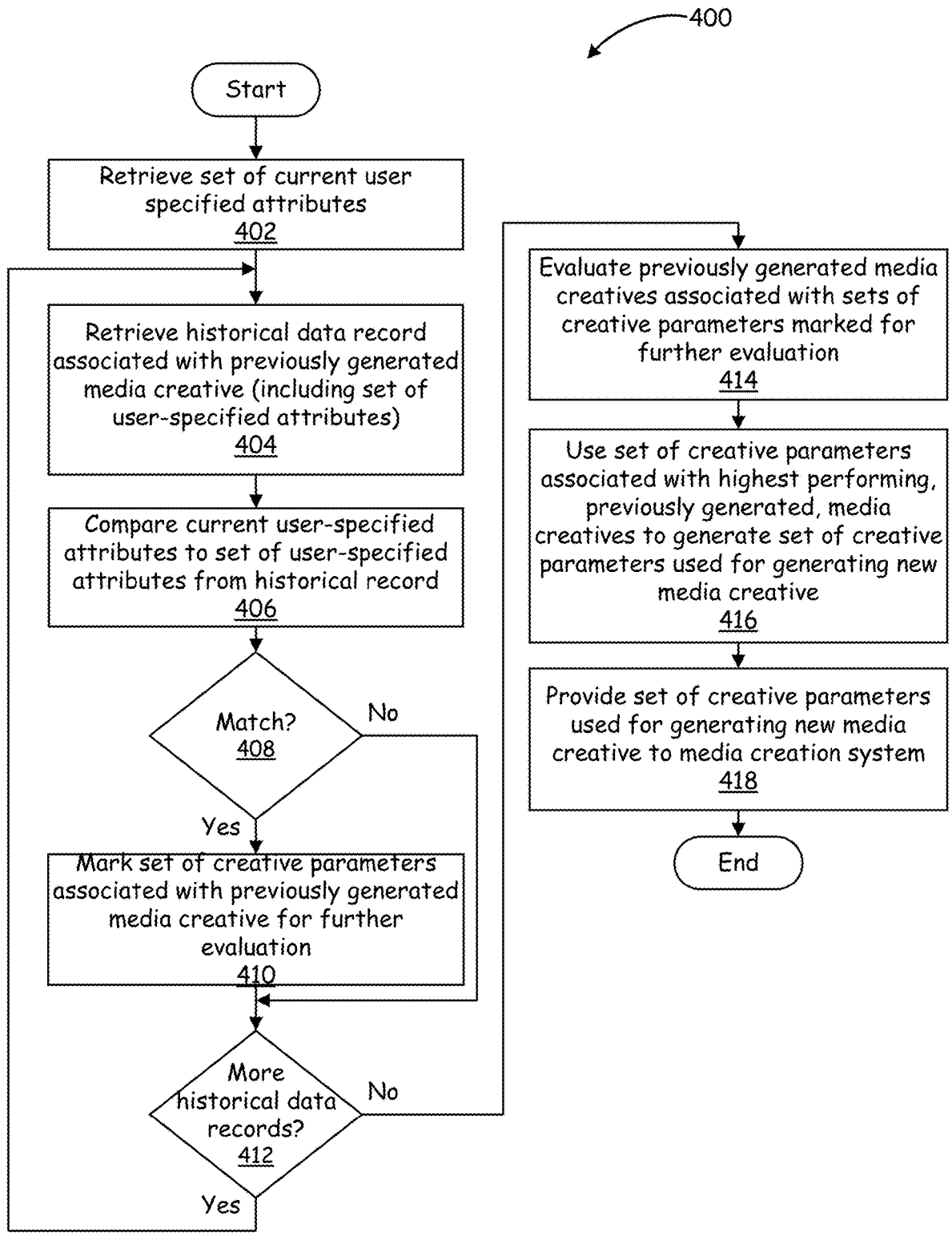
FIG. 4 is a flow diagram illustrating a method of generating creative parameters in accordance with various embodiments of the present disclosure.

Referring next to FIG. 4 a method 400 of generating creative parameters will be discussed in accordance with various embodiments of the present disclosure. As illustrated by block 402, a script creation system can obtain a set of current user-specified attributes. Obtaining the set of current user-specified attributes can include retrieving current user-specified attributes from storage, extracting the current user-specified attributes from an end user's request for a new creative, transmitting to an end user system a link to a GUI that allows the end user to select current user-specified attributes, or the like.

As illustrated by block 404, the script creation system retrieves a historical data record associated with previously generated media creative. The historical data record includes a set of user-specified attributes associated with the historical data record. In some embodiments, the historical data records are retrieved from a database implemented in a one or more storage devices, such as historical data storage 114 (FIG. 1). In some embodiments, a creative parameter generation module retrieves, controls, or facilitates retrieval of the historical data record. In other embodiments, an artificial intelligence module or natural language processing module retrieves, controls, or facilitates retrieval of the historical data record. In some embodiments, a creative parameter generation module is, itself, an artificial intelligence module.

As illustrated by block 406, the creative parameter generation module can compare the current user-specified attributes to a set of user-specified attributes from the historical record, sometimes referred to as "historical user-specified attributes." Note that the set of historical user-specified attributes being discussed are the same user-selected attributes that were used to originally generate the previously generated media creative.

As illustrated by block 408, a check can be made to determine if the set of historical user-specified attributes matches the set of current user specified attributes. In some embodiments, a 100% match is required to be considered "matching," but in other embodiments a match threshold of less than 100% can be used. Consider the case where an entire set of current user-specified attributes matches corresponding attributes in a set of historical user-specified generated for the same industry, at the same location, etc. attributes, but the set of historical user-specified attribute includes a greater (or lesser) number of attributes. In that case, the fact that all coextensive attributes (those that exist in both the set of current user-specified attributes and in the set of historical user-specified attributes) match can result in a determination that the set of attributes matches.

In some embodiments, the set of current user-specified attributes and the set of historical user-specified attributes may be considered to match, even if different terminology is used to describe one or more attributes. For example, a current user-specified industry attribute of "remodeling services" may be considered to match a historical user-specified industry attribute of "home repair services." By identifying sets of historical user-specified attributes that match the set of current user-specified attributes associated with previous creatives generated for the same industry, at the same location, etc., the sets of creative parameters associated with those same previous creatives can be considered for use in generating a current set of creative parameters.

As illustrated by block 410, if the set of current user-specified attributes matches the set of historical user-specified attributes, the set of creative parameters associated with the previously generated media creative can be marked for further evaluation. As illustrated by block 412, if the two sets of user-specified attributes do not match, a check can be made to determine if there are more historical data records to evaluate. If there are more historical data records to evaluate, the method returns to block 404; if not method 400 proceeds to block 414.

As illustrated by block 414, the performance of each of the previously generated media creatives associated with marked sets of historical creative parameters can be evaluated and/or ranked in terms of effectiveness and/or optimization. Evaluating the performance (e.g. effectiveness and/or optimization level) of the previously generated creatives can include using feedback included in the historical data to determine whether the previously generated creative was accepted by the end user who requested the creative, determining whether the previously generated creative was marked for re-use, or the like. In some embodiments, the evaluation includes comparing a number of impressions generated by the previously generated creative, comparing a user-provided rating of the previously generated creative, or the like. In various embodiments, the previously generated media creatives are ranked relative to each other based on how many times the same set of creative parameters has been associated with accepted historical creatives from both the current user, or one or more categories of previous users.

As illustrated by block 416, the set of historical creative parameters associated with the highest performing historical creatives (i.e. previously generated media creatives) can be used to generate a set of current creative parameters (i.e. creative parameters used for generating the new media creative). In some embodiments, the set of historical creative parameters associated with the highest performing historical creatives are used as a baseline template, which can be modified to generate the set of current creative parameters based on information associated with one or more individual creative parameters included in one or more other sets of creative parameters.

As illustrated by block 418 the set of current creative parameters generated at block 416 is transmitted to a media creation system, which uses them to generate the new media creative.

Referring now to FIGS. 5-9 graphical user interfaces (GUIs) used to obtain information about a requested creative, will be discussed in accordance with various embodiments of the present disclosure. In some embodiments GUIs make up a portion of the screen displayed by the system to the end user, allowing multiple GUIs to be displayed on the same screen or website. In other embodiments, each GUI is displayed to the end user on different screens or websites (each having its own Uniform Resource Locator (URL)). In at least one embodiment, script creation system 110 (FIG. 1) provides one or more GUI's to end user system 120 (FIG. 1) to gather information related to a new creative requested by a user associated with end user system 120. The information collected can be used to provide end users with a simplified method of commissioning creatives tailored to their industry, location, etc. using only basic information. In some embodiments, users are permitted to provide more detailed input if they so desire. But the systems and techniques disclosed herein can generate creatives with very little information, as compared to conventional creative generation systems. Furthermore, the information collected via the GUIs illustrated in FIGS. 5-9 allow creative parameters of new creatives to be selected based on the performance of past creatives, without requiring the end users to know what creative parameters are important to the user's particular industry, location, etc.

Figure 5:
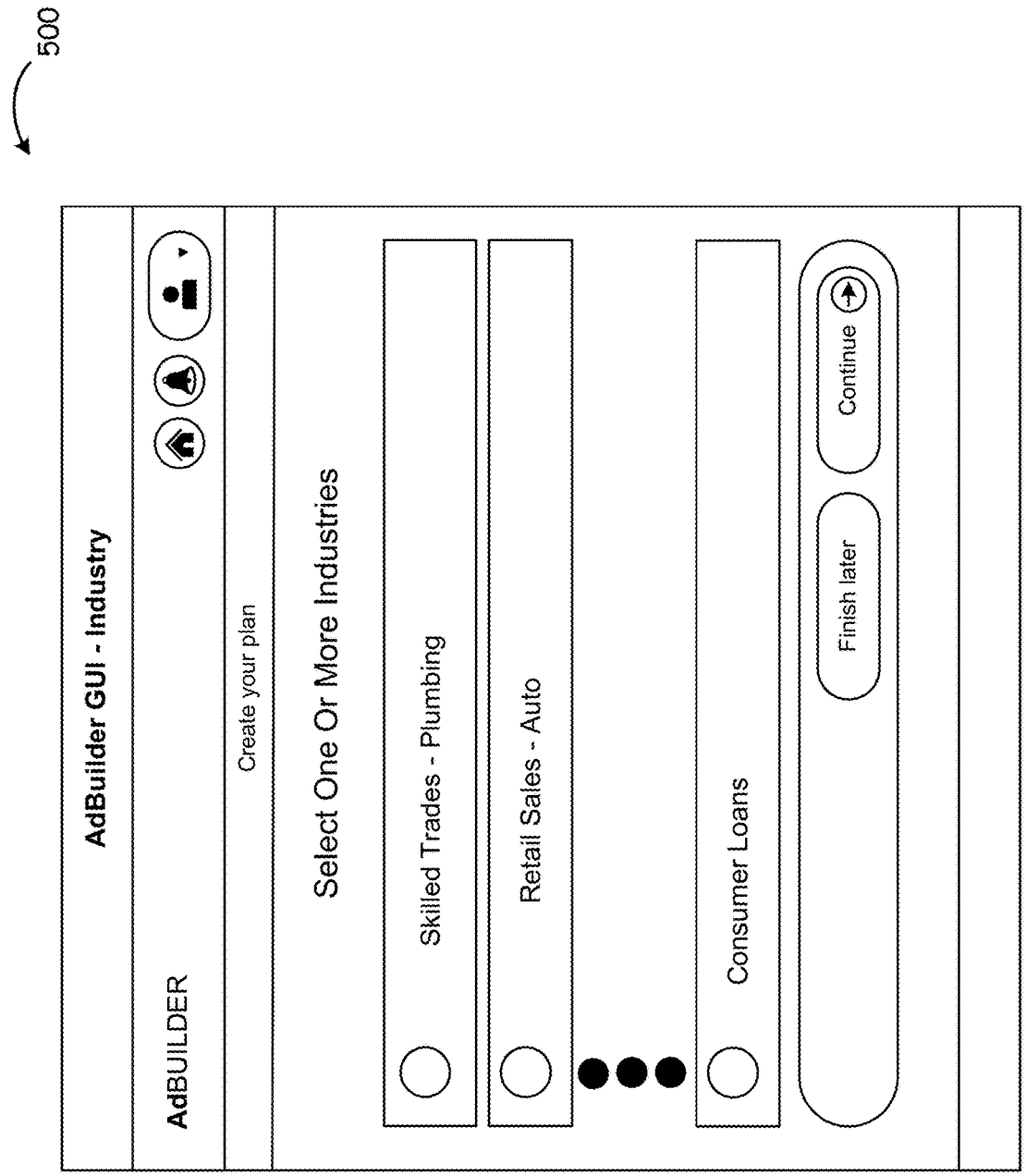

Referring to FIG. 5, an industry input GUI 500 can be used to obtain industry information of the end user's desired creative is illustrated. In at least one embodiment, a user can be presented with a pre-populated list of industries, and select from the list the industry that the end user believes most closely matches his or her business or other concern. Industry input GUI 500 can be one of multiple GUIs used to obtain current user-selected attributes of a creative. In some embodiments, industry input GUI 500 is presented before other GUIs used to obtain current user-selected attributes of a creative, because input regarding the end user's industry affects items populated in other menus. In some embodiments, the GUI configuration can be based on the end user's profile (e.g., using authentication or username/password) or previous interactions with the system (e.g., using cookies), allowing the system to customize the GUIs to that particular end user.

Figure 6:

Referring to FIG. 6, location GUI 600 can be used to obtain location information associated with the end user's business. In some embodiments, the user can enter free-form alphanumeric text into an input field. In other embodiments, location GUI 600 requires end users to select from pre-populated drop-down menus. In yet other embodiments, users can select location information by clicking on a map location (not specifically illustrated). Location information can include one or more physical addresses, a general market area to which a requested creative should be targeted, or the like. Location information can be an important input when deciding creative parameters, because at one location, for example South Texas, creatives generated according to a first set of creative parameters may be more effective than creatives generated according to a second set of parameters. At a second location, for example San Jose, Calif., the opposite may be true. Location information can also be used by the system to ensure creatives are in accordance with all advertising statutes, rules or laws relating to the demographic receiving the advertisements or specific location the advertisement will be broadcast.

Figure 7:
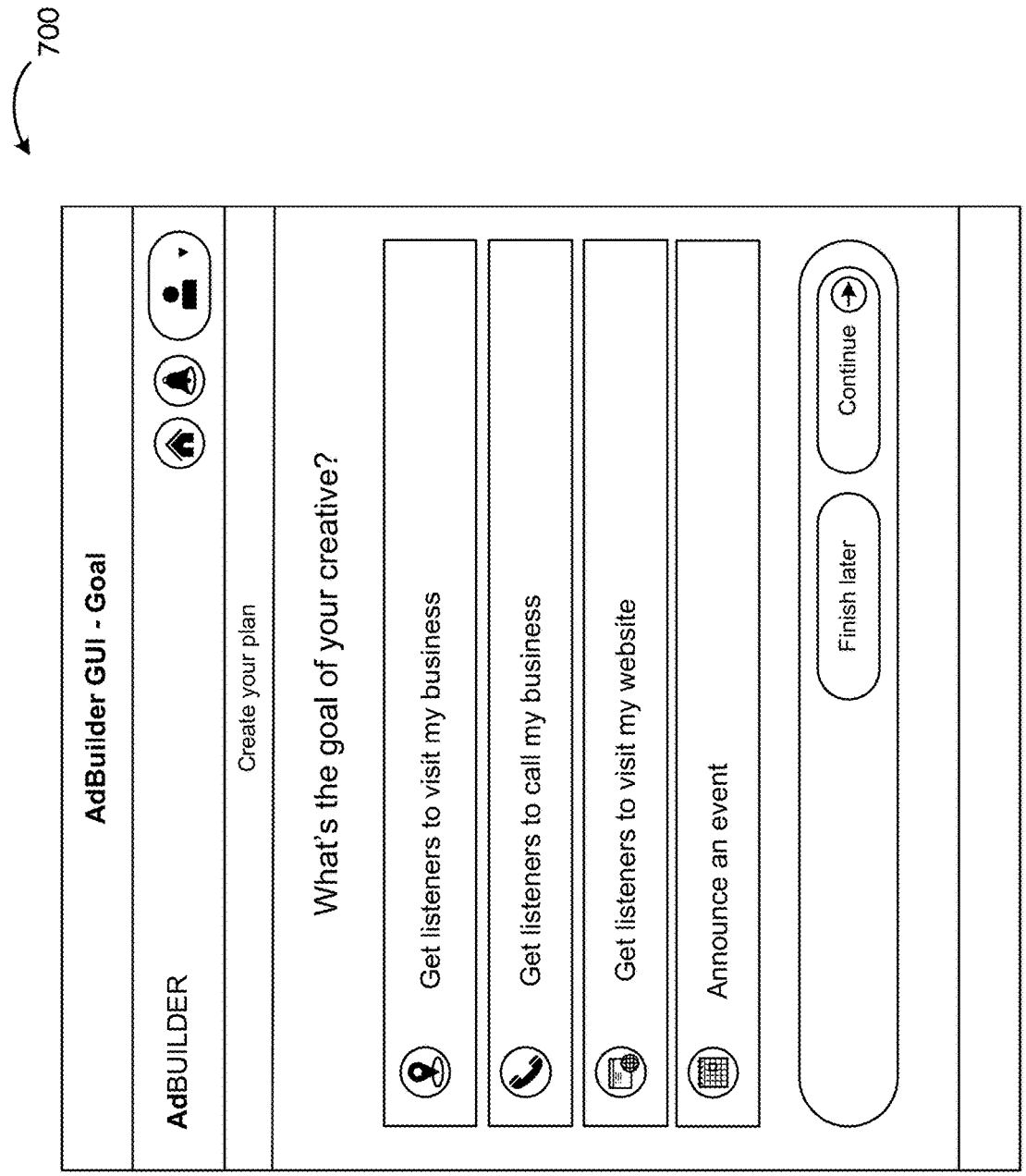

Referring to FIG. 7, goal GUI 800 can be used to obtain information about why the end user is requesting the creative. For example, is the goal of the creative to get listeners to visit a brick and mortar store location? Is the goal to entice listeners to attend an event? Or perhaps the goal of the creative is to increase call volume, or website traffic. Different goals can usually be best achieved by a creative generated using a particular set of creative parameters. And the set of creative parameters can be determined, at least in part, based on the "goal" selected by the end user.

Figure 8:
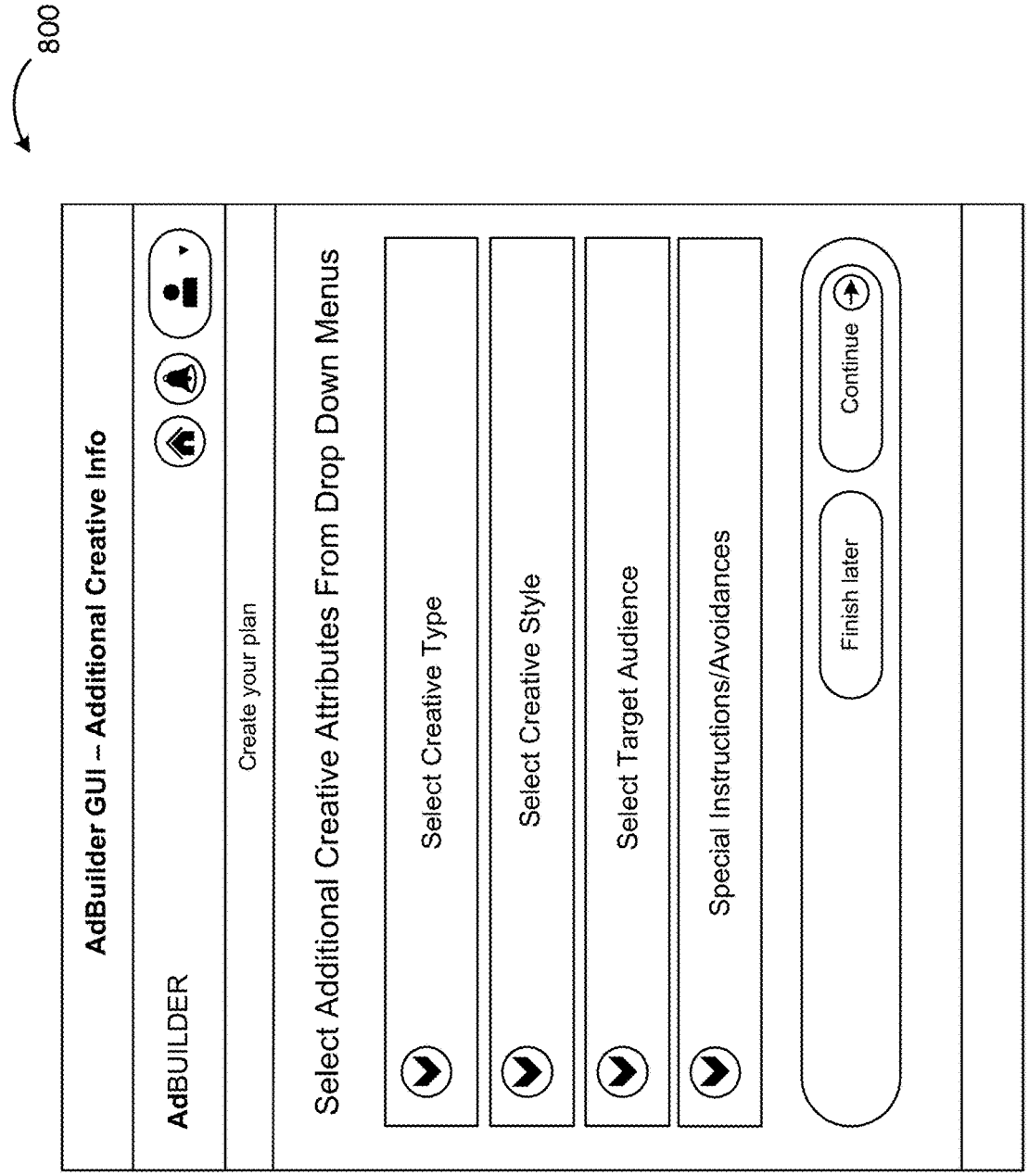

Referring to FIG. 8, additional creative information GUI 800 can be used to obtain information about other user-selected creative attributes. In some implementations, an end user can use additional creative information GUI 800 to select additional creative attributes such as a creative type (e.g. print or audio), a creative style (e.g. formal or informal), specify a target audience, and provide additional special instructions. In some embodiments, additional or fewer "additional creative attributes" are presented via additional creative information GUI 800, based on an end user's industry, location, or other previously chosen user-selected attribute.

Figure 9:
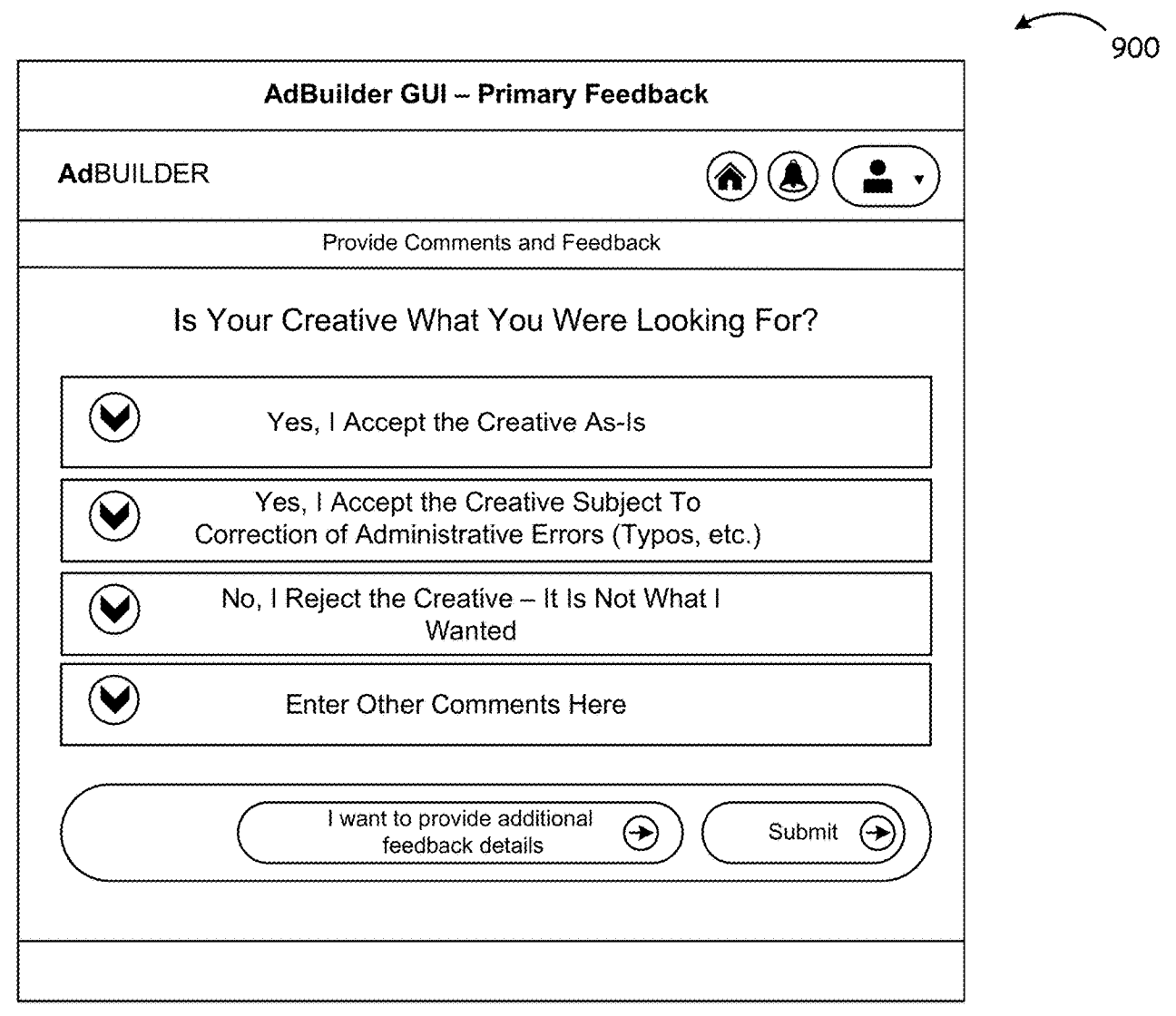

Referring to FIG. 9, primary feedback GUI 900 is used to obtain user feedback regarding a new creative. In at least one embodiment, information obtained via primary feedback GUI 900 is used as a basis for quickly determining creative parameters for other creatives, while additional, more detailed feedback may not be used. This can be particularly useful when an artificial intelligence module's access to computing resources are limited, or when there is limited time allowed to make a decision. However, in at least some embodiments, additional feedback details can be used in conjunction with the accept/reject feedback obtained via primary feedback GUI 900. In various embodiments, feedback obtained via primary feedback GUI 900 is used to allow selection of creative parameters that optimize the likelihood that newly generated creatives will be acceptable to end users.

Figure 10:
FIG. 10 is diagram illustrating a historical record, in accordance with various embodiments of the present disclosure.

Referring next to FIG. 10 an example of a historical record 1000 will be discussed in accordance with various embodiments of the present disclosure. As illustrated, historical record 1000 can include a user/client identifier 1010 linked to a creative identifier 1020. In various embodiments a separate historical record 1000 can be maintained for each user or client, and/or for each creative. In various embodiments, a historical record 1000 can be implemented using multiple database tables linked to each other. Each creative can be associated with a creative identifier, where at least the combination of user/client identifier and creative identifier is unique, and can be used to identify particular historical creatives stored in a historical data storage, such as historical data storage 114 (FIG. 1).

Creative parameters 1030 used to generate each historical creative can also be associated with the creative identifier 1020. The creative parameters themselves, or a link to the creative parameters, can be stored in historical record 1000, along with the user-selected attributes 1040 (or a link to the user-selected attributes), and feedback results 1050 (or a link to the feedback results).

Creative parameters 1030 illustrated in historical record 1000 can indicate a media creative, and include tone (e.g. the mood implied by the author's word choice), mood (e.g. the emotion that the word choice intends to evoke in the consumer), pace, keywords, voice type (e.g. male, female, high energy, soothing), pitch, volume, background music, and the like. The underlying values of each of the creative parameters 1030 are not illustrated, but the creative parameter elements can include pointers that link to the actual values of the parameters (e.g. metadata providing pointers to datasets in databases).

User selected attributes 1040 illustrated in historical record 1000 can include industry, location, call to action, creative type (e.g. print, audio, etc.), creative style (the purpose of the creative, e.g. to entertain, educate, etc.), a target audience (e.g. bi-lingual high school graduates), and avoidances (e.g. terms, phrases, imagery, etc.). As with creative parameters 1030, the underlying values of each of the User selected attributes 1040 are not illustrated, but the individual elements can include pointers that link to the actual values of the attributes.

Feedback result 1050 can be, as illustrated here, a single element with a value of accepted, rejected, or conditionally accepted, or a pointer to that element. In other embodiments, feedback results can also include other information (not illustrated), such as a user-supplied rating, a re-use flag indicating whether the end user provided feedback stating that the user decided to re-use the creative rather than have a new creative generated, or the like. A re-use indicator can provide an indication of quality or performance, because an end user is unlikely to choose to re-use a poorly performing creative.

Referring now to FIG. 11, a high-level block diagram of a processing system is illustrated and discussed. Processing system 1100 can include one or more central processing units, such as CPU A 1105 and CPU B 1107, which may be conventional microprocessors interconnected with various other units via at least one system bus 1110. CPU A 1105 and CPU B 1107 may be separate cores of an individual, multi-core processor, or individual processors connected via a specialized bus 1111. In some embodiments, CPU A 1105 or CPU B 1107 may be a specialized processor, such as a graphics processor, other co-processor, or the like.

Processing system 1100 can include random access memory (RAM) 1120; read-only memory (ROM) 1115, wherein the ROM 1115 could also be erasable programmable read-only memory (EPROM) or electrically erasable programmable read-only memory (EEPROM); input/output (I/O) adapter 1125, for connecting peripheral devices such as disk units 1130, optical drive 1136, or tape drive 1137 to system bus 1110; a user interface adapter 1140 for connecting keyboard 1145, mouse 1150, speaker 1155, microphone 1160, or other user interface devices to system bus 1110; communications adapter 1165 for connecting processing system 1100 to an information network such as the Internet or any of various local area networks, wide area networks, telephone networks, or the like; and display adapter 1170 for connecting system bus 1110 to a display device such as monitor 1175. Mouse 1150 can have a series of buttons 1180, 1185 and may be used to control a cursor shown on monitor 1175.

It will be understood that processing system 1100 may include other suitable data processing systems without departing from the scope of the present disclosure. For example, processing system 1100 may include bulk storage and cache memories, which provide temporary storage of at least some program code in order to reduce the number of times code must be retrieved from bulk storage during execution.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further, note that the memory element may store, and the processing module, module, processing circuit, and/or processing unit execute, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined so long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method comprising:
obtaining, by an artificial intelligence pattern matching module included in a script creation system, a set of current user-specified attributes to be used in generating a new media creative, wherein obtaining the set of current user-specified attributes includes:
obtaining a written script from a script creation module included in the script creation system;
extracting keywords from the written script;
obtaining an audio file from a media creation system; and
extracting voice characteristics from the audio file;
obtaining, by the artificial intelligence pattern matching module included in the script creation system, historical data records, wherein the historical data records include sets of historical user-specified attributes associated with previously generated media creatives and a re-use indicator flag indicating whether end-user-provided feedback indicates that a particular previously generated media creative was to be re-used;
using the artificial intelligence pattern matching module included in the script creation system to compare coextensive attributes included in both—the set of current user-specified attributes and individual sets of historical user-specified attributes to identify matching coextensive attributes;
selecting one or more previously generated media creatives for further evaluation based on whether the one or more previously generated media creatives is associated with a set of historical user-specified attributes that includes matching coextensive attributes;
determining, by an artificial intelligence module included in the script creation system, one or more highest-performing-previously-generated-media creatives based, at least in part, on the re-use indicator flag;
generating, by the script creation system, based on the set of current user-specified attributes and the sets of historical user-specified attributes associated with the one or more highest-performing-previously-generated-media creatives, a set of creative parameters specifying content characteristics of the new media creative, wherein generating includes;
transmitting the set of creative parameters from the script creation system to a media creative generation system;
receiving, by the script creation system, the new media creative transmitted from the media creative generation system;
providing the new media creative to an end user system associated with an end user;
receiving feedback associated with the new media creative; and
storing the feedback, the set of creative parameters, and the current user-specified attributes as an additional historical data record, wherein the additional historical data record is associated with the new media creative.

2. The method of claim 1, wherein determining the one or more highest-performing-previously-generated-media creatives includes:
  determining how many times the same set of creative parameters has been associated with user-accepted media creatives.

3. The method of claim 1, wherein generating the set of creative parameters specifying content characteristics of the new media creative further includes:
  using the sets of historical user-specified attributes associated with the one or more highest-performing-previously-generated-media creatives as a baseline template; and
  modifying the baseline template based on information associated with creative parameters included in one or more other sets of creative parameters.

4. The method of claim 1, wherein obtaining the current user-specified attributes to be used in generating a new media creative includes:
  selecting the set of user-specified attributes to be used in generating the new media creative from one or more webpages based on one or more of an industry associated with the end user or a location associated with the end user, wherein the one or more webpages includes different input fields associated with different current user-specified attributes.

5. The method of claim 4, wherein the different input fields associated with the different current user-specified attributes include:
  at least one input field configured to receive user input identifying the industry associated with the end user;
  at least one input field configured to receive user input identifying a location associated with the end user;
  at least one input field configured to receive user input identifying a user-specified goal of the new media creative; and
  at least one input field configured to receive user input identifying a call to action.

6. The method of claim 1, wherein receiving feedback includes:
  transmitting, to the end user system, a feedback page requesting feedback related to the new media creative, wherein the feedback is limited to the following three feedback options: accept the media creative as-is, reject the new media creative, accept the new media creative subject to correction of administrative errors.

7. The method of claim 1, further comprising:
  wherein the historical data records further include at least one previously generated media creative;
  using natural language processing to generate content metadata from contents of the at least one previously generated media creative; and
  generating the set of creative parameters based, at least in part, on the content metadata.

8. A script creation system comprising:
  at least one processor configured to implement an artificial intelligence pattern matching module;
  memory coupled to the at least one processor and storing a program of instructions;
  a communications interface coupled to the at least one processor;
  the at least one processor configured to execute a program of instructions stored in the memory, the program of instructions including:
    at least one instruction to obtain, by the artificial intelligence pattern matching module, a set of current user-specified attributes to be used in generating a new media creative, wherein the at least one instruction to obtain the set of current user-specified attributes includes:
      at least one instruction to obtain a written script from a script creation module included in the script creation system;
      at least one instruction to extract keywords from the written script;
      at least one instruction to obtain an audio file from a media creation system; and
      at least one instruction to extract voice characteristics from the audio file;
    at least one instruction to obtain, by the artificial intelligence pattern matching module, historical data records, wherein the historical data records include sets of historical user-specified attributes associated with previously generated media creatives and a re-use indicator flag indicating whether end-user-provided feedback indicates that a particular previously generated media creative was to be re-used;
    at least one instruction to use the artificial intelligence pattern matching module included in the script creation system to compare coextensive attributes included in both the set of current user-specified attributes and individual sets of historical user-specified attributes to identify matching coextensive attributes;
    at least one instruction to select one or more previously generated media creatives for further evaluation based on whether the one or more previously generated media creatives is associated with a set of historical user-specified attributes that includes matching coextensive attributes;
    at least one instruction to determine, based at least in part, on the re-use indicator flag, one or more highest-performing-previously-generated-media creatives using an artificial intelligence module;
    at least one instruction to generate, based on the set of current user-specified attributes and the sets of historical user-specified attributes associated with the one or more highest-performing-previously-generated-media creatives, a set of creative parameters specifying content characteristics of the new media creative;
    at least one instruction to transmit the set of creative parameters, via the communications interface to a media creative generation system;
    at least one instruction to receive the new media creative transmitted from the media creative generation system;
    at least one instruction to provide the new media creative to an end user system associated with an end user;
    at least one instruction to receive feedback associated with the new media creative from the end user system; and
    at least one instruction to store the feedback, the set of creative parameters, and the current user-specified attributes as an additional historical data record, wherein the additional historical data record is associated with the new media creative.

9. The system of claim 8, wherein the at least one instruction to determine the one or more highest-performing-previously-generated-media creatives includes:
  at least one instruction to determine how many times the same set of creative parameters has been associated with user-accepted media creatives.

10. The system of claim 8, wherein the at least one instruction to generate the set of creative parameters specifying content characteristics of the new media creative further includes:
   at least one instruction to use the sets of historical user-specified attributes associated with the one or more highest-performing-previously-generated-media creatives as a baseline template; and
   at least one instruction to modify the baseline template based on information associated with creative parameters included in one or more other sets of creative parameters.

11. The system of claim 8, wherein the at least one instruction to obtain the current user-specified attributes to be used in generating a new media creative includes:
   at least one instruction to select the set of user-specified attributes to be used in generating the new media creative from one or more webpages based on one or more of an industry associated with the end user or a location associated with the end user, wherein the one or more webpages includes different input fields associated with different current user-specified attributes.

12. The system of claim 11, wherein the different input fields associated with the different current user-specified attributes include:
   at least one input field configured to receive user input identifying the industry associated with the end user;
   at least one input field configured to receive user input identifying a location associated with the end user;
   at least one input field configured to receive user input identifying a user-specified goal of the new media creative; and
   at least one input field configured to receive user input identifying a call to action.

13. The system of claim 8, wherein the at least one instruction to receive feedback includes:
   at least one instruction to transmit, to the end user system, a feedback page requesting feedback related to the new media creative, wherein the feedback is limited to the following three feedback options: accept the media creative as-is, reject the new media creative, accept the new media creative subject to correction of administrative errors.

14. The system of claim 8, wherein the program of instructions further includes:
   wherein the historical data records further include at least one previously generated media creative;
   at least one instruction to use natural language processing to generate content metadata from contents of the at least one previously generated media creative; and
   at least one instruction to generate the set of creative parameters based, at least in part, on the content metadata.

15. A non-transitory computer readable medium storing a program of instructions configured to be executed by a processor, the program of instructions including:
   at least one instruction to obtain, by an artificial intelligence pattern matching module, a set of current user-specified attributes to be used in generating a new media creative, wherein the at least one instruction to obtain the set of current user-specified attributes includes:
      at least one instruction to obtain a written script from a script creation module;
      at least one instruction to extract keywords from the written script;
      at least one instruction to obtain an audio file from a media creation system; and
      at least one instruction to extract voice characteristics from the audio file;
   at least one instruction to obtain, by the artificial intelligence pattern matching module, historical data records, wherein the historical data records include sets of historical user-specified attributes associated with previously generated media creatives and a re-use indicator flag indicating whether end-user-provided feedback indicates that a particular previously generated media creative was to be re-used;
   at least one instruction to use the artificial intelligence pattern matching module to compare coextensive attributes included in both the set of current user-specified attributes and individual sets of historical user-specified attributes to identify matching coextensive attributes;
   at least one instruction to select one or more previously generated media creatives for further evaluation based on whether the one or more previously generated media creatives is associated with a set of historical user-specified attributes that includes matching coextensive attributes;
   at least one instruction to determine, based at least in part, on the re-use indicator flag, one or more highest-performing-previously-generated-media creatives using an artificial intelligence module;
   at least one instruction to generate, based on the set of current user-specified attributes and the sets of historical user-specified attributes associated with the one or more highest-performing-previously-generated-media creatives, a set of creative parameters specifying content characteristics of the new media creative;
   at least one instruction to transmit the set of creative parameters to a media creative generation system;
   at least one instruction to receive the new media creative transmitted from the media creative generation system;
   at least one instruction to provide the new media creative to an end user system associated with an end user;
   at least one instruction to receive feedback associated with the new media creative from the end user system; and
   at least one instruction to store the feedback, the set of creative parameters, and the current user-specified attributes as an additional historical data record, wherein the additional historical data record is associated with the new media creative.

16. The non-transitory computer readable medium of claim 15, wherein the at least one instruction to determine the one or more highest-performing-previously-generated-media creatives includes:
   at least one instruction to determine how many times the same set of creative parameters has been associated with user-accepted media creatives.

17. The non-transitory computer readable medium of claim 15, wherein the at least one instruction to specifying content characteristics of the new media creative further includes:
   at least one instruction to use the sets of historical user-specified attributes associated with the one or more highest-performing-previously-generated-media creatives as a baseline template; and
   at least one instruction to modify the baseline template based on information associated with creative parameters included in one or more other sets of creative parameters.

18. The non-transitory computer readable medium of claim 15, wherein the at least one instruction to obtain the current user-specified attributes to be used in generating a new media creative includes:

at least one instruction to select the set of user-specified attributes to be used in generating the new media creative from one or more webpages based on one or more of an industry associated with the end user or a location associated with the end user, wherein of the one or more webpages includes different input fields associated with different current user-specified attributes.

19. The non-transitory computer readable medium of claim 18, wherein the different input fields associated with the different current user-specified attributes include:

at least one input field configured to receive user input identifying the industry associated with the end user;

at least one input field configured to receive user input identifying a location associated with the end user;

at least one input field configured to receive user input identifying a user-specified goal of the new media creative; and at least one input field configured to receive user input identifying a call to action.

20. The non-transitory computer readable medium of claim 15, wherein the at least one instruction to receive feedback includes:

at least one instruction to transmit, to the end user system, a feedback page requesting feedback related to the new media creative, wherein the feedback is limited to the following three feedback options: accept the media creative as-is, reject the new media creative, accept the new media creative subject to correction of administrative errors.

* * * * *